United States Patent
Goldstein

[19]

[11] Patent Number: 5,975,599
[45] Date of Patent: Nov. 2, 1999

[54] VEHICLE BODY PROTECTION DEVICE AND METHOD

[76] Inventor: Allan J. Goldstein, 7071 W. Washington Ave., Las Vegas, Nev. 89128

[21] Appl. No.: 08/940,441

[22] Filed: Sep. 30, 1997

[51] Int. Cl.[6] .................................................. B60R 19/42
[52] U.S. Cl. .......................................... 293/128; 280/770
[58] Field of Search .................................... 293/126, 128; 296/98, 40, 136; 280/770

[56] References Cited

U.S. PATENT DOCUMENTS

| 2,212,493 | 8/1940 | Brunken . | |
|---|---|---|---|
| 2,675,983 | 4/1954 | King . | |
| 2,889,165 | 6/1959 | Zientara . | |
| 3,147,176 | 9/1964 | Haslam . | |
| 3,563,594 | 2/1971 | London . | |
| 3,610,669 | 10/1971 | Morrisey, Sr. . | |
| 3,610,684 | 10/1971 | Richter . | |
| 3,738,695 | 6/1973 | McBee . | |
| 3,882,574 | 5/1975 | Martinez . | |
| 4,002,363 | 1/1977 | James . | |
| 4,363,507 | 12/1982 | Bays . | |
| 4,401,331 | 8/1983 | Ziner et al. . | |
| 4,561,685 | 12/1985 | Fischer . | |
| 4,643,471 | 2/1987 | Fishback . | |
| 4,707,008 | 11/1987 | Falco . | |
| 4,708,380 | 11/1987 | Cruz | 293/128 |
| 4,810,013 | 3/1989 | Spears . | |
| 4,810,015 | 3/1989 | McNeil . | |
| 4,828,303 | 5/1989 | Soria . | |
| 4,958,881 | 9/1990 | Piros | 296/136 X |
| 4,991,891 | 2/1991 | Karshens | 293/128 |
| 5,029,933 | 7/1991 | Gillem | 296/136 |
| 5,071,181 | 12/1991 | Wagner . | |
| 5,149,166 | 9/1992 | Wille et al. . | |
| 5,193,869 | 3/1993 | Land . | |
| 5,320,392 | 6/1994 | Hart | 293/128 |
| 5,364,155 | 11/1994 | Kuwahara et al. | 296/136 |
| 5,597,196 | 1/1997 | Gibbs | 296/98 |

FOREIGN PATENT DOCUMENTS

| 1077058 | 11/1954 | France | 293/128 |

*Primary Examiner*—D. Glenn Dayoan
*Assistant Examiner*—Chad Wells
*Attorney, Agent, or Firm*—Harry M. Weiss; Jeffrey Weiss; Paul Davis

[57] ABSTRACT

A vehicle side bumper or protection device is provided to protect the sides of vehicles such as automobiles against the violent impact of carelessly opened doors of adjacent vehicles parked too close. The bumper or protection device includes an elongated cushioned pad which covers a substantial portion of the automobile side and resists the impact. The pad is releasably secured to a front side portion of the automobile and inside the trunk by a pair of straps and a locking bar. A first strap extends forwardly from the pad and is secured by a hook to the front end. A second strap extends rearwardly from the pad and is secured around the locking bar by a buckle. The locking bar maintains a bias fit against oppositely disposed inside side walls of the trunk. When the trunk is closed and locked, this arrangement makes the bumper or protection device theft resistant. A pair of these protection devices can be used to protect each side of the vehicle.

18 Claims, 1 Drawing Sheet

VEHICLE BODY PROTECTION DEVICE AND METHOD

FIELD OF THE INVENTION

The present invention relates generally to bumpers or protection devices for the sides of vehicles to protect against damage caused by externally-applied impact forces and methods therefor. More specifically, this invention relates to a quick attach-quick detach and anti-theft automobile body protection device for preventing dents, nicks, and scratches from impact of a door of another automobile or the like and a method therefor.

BACKGROUND OF THE INVENTION

It is a rare individual who can claim that the body of his automobile has not been damaged in a parking lot by a carelessly opened door. With space often at a premium, designers and owners of parking lots and structures try to maximize the spare and monetary return by putting in as many parking spaces as can fit into that space. Consequently, the parking spaces are often narrow. As a result, adjacent automobiles are usually so close that the side of one or both may become damaged or "dinged" when the door of one is carelessly opened. Repair of the damage can become costly and inconvenient and if done poorly, can accelerate depreciation of the automobile's value. However, this type of damage may be minimized by the use of automobile side bumpers or protection devices.

In recognition of this problem, there have been several prior aftermarket side bumpers or protection devices which attempt to shield the sides of an automobile from opening doors of adjacent vehicles. In addition, some automobiles have been equipped by the manufacturer with side body moldings. These moldings affixed to the sides of some automobiles have not been entirely successful as such moldings are often not placed correctly to prevent damage as side doors of various vehicles (trucks, vans and automobiles) vary greatly in their size, shape and contour. Protection can often depend on the height of the adjacent vehicle door which is not going to be the same with every vehicle or automobile. Furthermore, the side moldings can detract from the appearance of those automobiles so equipped. Moreover, as the public is all too aware, the market for stolen automobile parts and accessories is thriving. If the part or accessory is not affixed, and sometimes even if it is, it is often the target of thieves. Although some of the prior bumpers or protection devices included anti-theft features (e.gs. U.S. Pat. No. 4,828,303 to Soria and U.S. Pat. No. 4,708,380 to Cruz), none adequately protect the sides of an automobile body against externally-applied impact forces while still preventing theft of the device.

Accordingly, there has been a need for a novel vehicle (i.e. automobile) body protection device and method which can shield the automobile from externally-applied impact forces, is of simplified construction, easy to use, and is protected against unauthorized removal from the automobile. Such a device is also needed which can be placed on the automobile without particular regard for a fixed position where a door might impact thereby taking into account the variety of vehicle door shapes, sizes and contours. Further, a device is needed which can be adapted to be used with a variety of different vehicles or automobiles. The present invention fulfills these needs and provides other related advantages.

SUMMARY OF THE INVENTION

Accordingly, it is an object of this invention to provide an improved quick attach-quick detach and anti-theft vehicle protection device and method to protect side portions of the vehicle from damage.

The present invention resides in an improved vehicle (i.e.automobile) side bumper or protection device which shields the automobile from nicks, scratches and dents and which is easy to use, adjustable to be used on a variety of cars and which is theft resistant. The bumper or protection device comprises, generally, a pad or protection member to shield each side of the automobile body from externally applied forces, and means for releasably fastening the pad or protection member to the automobile. Locking means are provided for securing the bumper or protection device against theft when installed on the automobile.

In a preferred form of the invention, the bumper or protection device provides a theft-resistant device for protecting at least one side of the automobile against damage caused by opening doors of adjacent automobiles. The pad or protection member includes an elongated cushioned pad that is installed for protection in a generally horizontally disposed position over a substantial portion of the automobile side. The cushioned pad has a forward end and a rearward end.

The fastening means, in the preferred embodiment, comprises means for releasably securing the cushioned pad to the side of the automobile. The securing means includes a flexible first strap having a first end affixed to the forward end of the pad and a second free end having a fastening member such as a hook. The hook may be rubber coated. When the bumper or protection device is installed, the hook is releasably secured to a front end of the automobile, such as, preferably, to a front wheel well or, if desired, a front grill. A bendable rigid second strap having a first end affixed to the rearward end of the pad and a buckle near a second free end is also provided. The second strap extends rearwardly from the pad. When the bumper is installed, the second free end of the second strap is adjustably secured to the locking means securely located within the automobile trunk.

The locking means includes a locking bar assembly which includes an elongated adjustable locking bar and bearing means for bearing against the inside side walls of a trunk of the automobile to hold the bar assembly securely in place. The locking bar includes an outer bar and an inner bar having a spring thereon to make the locking bar longitudinally adjustable and provide a close bias locking fit within the trunk. The bearing means are located at both ends of the inner bar and preferably include suction cups oriented to forcibly bear against the trunk inside side walls to maintain the bias fit. The second free end of the second strap is preferably wrapped around one end of the bar. The second strap is tightened thereon by adjusting the buckle so that the bumper or protection device remains taut against the side of the automobile.

When the bumper or protection device is installed, it provides ample coverage over the side of the automobile and deflects impact from opening doors of adjacent vehicles.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
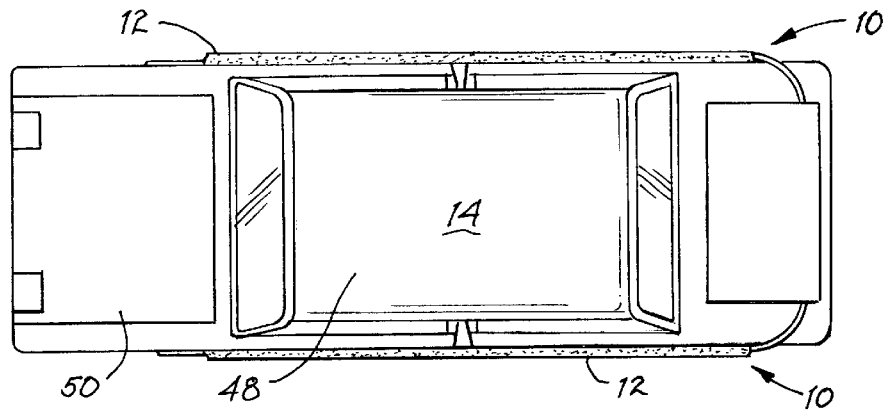
FIG. 1 is a top view of an automobile having a pair of side body protection devices releasably secured over the sides thereof and embodying the novel features of the invention.

As shown in the drawings for purposes of illustration, the present invention is concerned with a pair of improved vehicle side body protection devices, generally designated in the accompanying drawings by the reference numeral 10. The term vehicle as used herein is intended to cover all types of vehicles including trucks, vans, automobiles, etc. In the preferred embodiment, an automobile is used to illustrate the disclosed invention. The side body protection devices 10 each comprise, generally, an elongated cushioned pad 12 which is positioned generally horizontally across the sides of an automobile 14, straps 16 and 18 (see FIGS. 2, 5, and 6) which releasably secure the pad 12 to the automobile 14, and a locking bar assembly 20 which prevents unauthorized removal of each device 10 once installed on the automobile.

Figure 2:
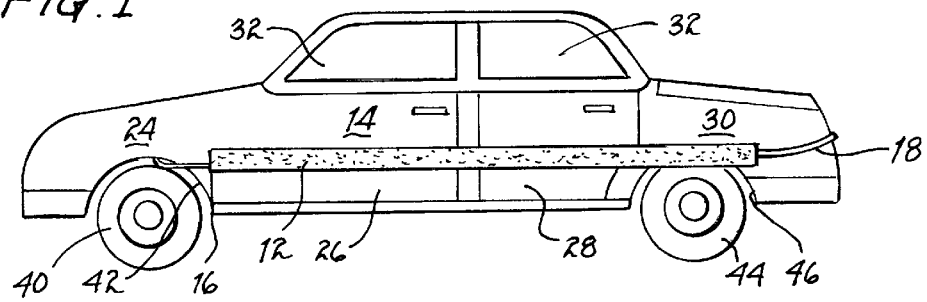
FIG. 2 is a side elevational view illustrating the manner in which a resilient pad (as shown in FIG. 1) is secured on the left side of the automobile at a forward end to a front wheel well of the automobile.
Figure 3:
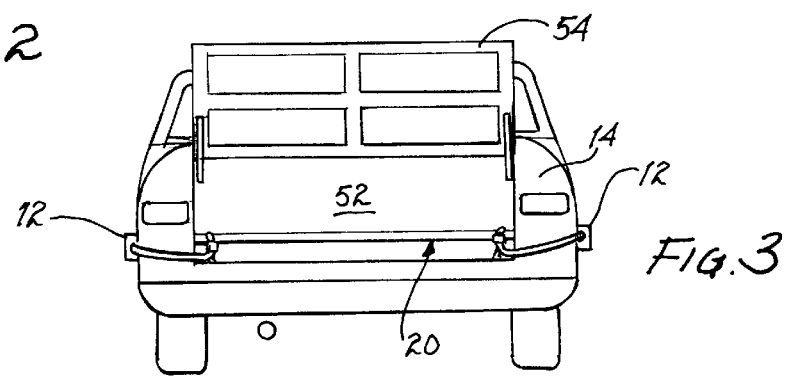
FIG. 3 is a rear view of the automobile of FIGS. 1 and 2 illustrating a trunk door of the automobile shown in the open position and the manner in which the protection devices are secured in a trunk by a locking bar.

The automobile 14 as shown in FIGS. 1–3 includes side portions and the body protection device 10 which is releasably secured to the side portions. Referring to FIG. 2, The automobile 14 includes a left side front panel 24, a pair of left side door panels 26 and 28, and a left side rear panel 30. Left side door panels 26 and 28 each have windows 32. The automobile 14 also includes a left side front wheel 40 and wheel well 42 and a left side rear wheel 44 and wheel well 46. The automobile 14 also includes a top 48 (see FIG. 1), a front hood 50, a trunk 52 (see FIG. 3) and a corresponding trunk door 54. The trunk 52 has a pair of inside side walls (not shown). The left and right sides of the automobile 14 are mirror images of each other so only the left side will be described. Another side body protection device, like device 10, can be secured on the right side of body 22 the automobile 14 as shown in FIG. 1.

In accordance with the present invention, and as illustrated with respect to a preferred embodiment in FIGS. 1–6, the automobile body protection device 10 is installed in a horizontally disposed position, for example, on the left side of the automobile 14 and is extended from a front end of the automobile 14 at the left side front wheel well 42 and into the trunk 52.

The elongated, generally horizontal cushioned pad 12 is preferably constructed of a resilient, soft, pad type material that can absorb and resist striking, such as from the impact by an adjacent opening automobile door In the preferred embodiment, the pad is 8.5 feet long and several inches wide. When the device 10 is installed, the pad 12 covers the door panels 26 and 28 and a portion of the front and rear side panels 24 and 30. Proper placement of the pad 12 over a substantial portion of the automobile body helps assure maximum protection against impact forces. The device 10 may, of course, be used on both 2-door and 4-door cars, trucks and the like. The pad 12 includes a forward end 66 (see FIGS. 5 and 6) that is oriented forwardly toward the front end of the automobile 14 and a rearward end 68 that is oriented rearwardly toward the trunk 52 when the device 10 is installed.

Figure 5:
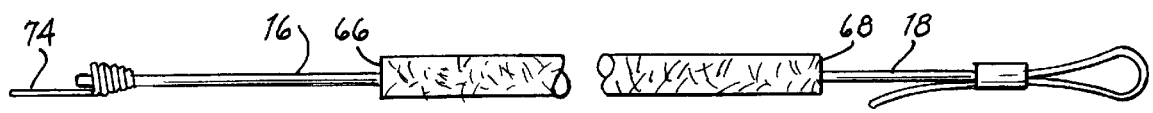
FIG. 5 is an enlarged fragmented side view of the resilient pad of FIGS. 1 and 2.
Figure 6:
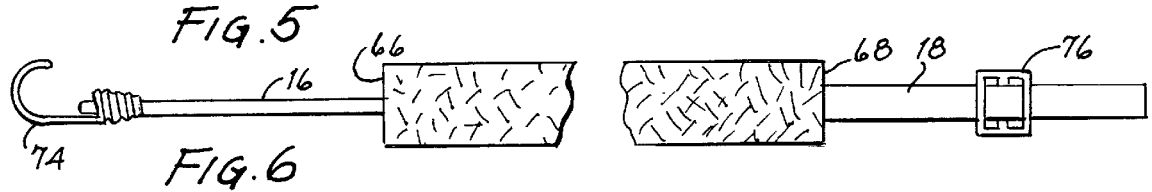
FIG. 6 is a fragmented top view of the resilient pad of FIG. 5.

As shown in FIGS. 5–6, the straps 16 and 18 each have a first end affixed respectively to the forward and rearward ends 66 and 68 of the pad 12 and a second end. Strap 16 extends forwardly from the forward end 66 of the pad 12 and includes a nonabrasive hook 74 located at the second end. The hook 74 may have a rubber or other type of protective coating so as not to damage the finish on the automobile. Strap 16 is comprised of a flexible elastic material such as an elastic rope or bungee type cord capable of expanding sufficiently to accommodate varying lengths of vehicles (automobiles) yet able to maintain a taut condition when the device 10 is attached to the sides of the automobile 14. Strap 18 extends rearwardly from the rearward end 68 of the pad 12 and includes a buckle 76 near the second end thereof. Strap 18 is comprised of a bendable rigid type material. In the preferred embodiment, the strap 18 is approximately three feet long and has sufficient length to enable each strap 18 to be wrapped about the respective end portions of the locking bar assembly 20 (see FIG. 3) and securely attached thereto by means of the buckle 76.

Figure 4:
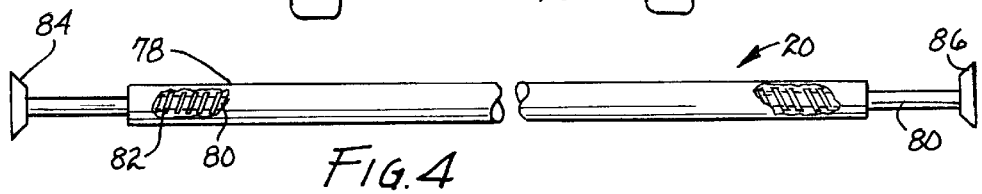
FIG. 4 is an enlarged fragmented view of a locking bar assembly including the locking bar illustrated in FIG. 3.

The locking bar assembly 20 is adjustable to be secured horizontally within any size trunk. With reference to FIG. 4, the locking bar assembly 20 preferably includes an outer bar shaped member 78 and an inner bar 80 that includes a surrounding spring 82 to form the adjustable locking bar assembly 20. The spring 82 operates against a pair of flanges or pins (not shown) to outwardly bias the ends of the locking bar assembly 20 into engagement with the inside side walls of the trunk 52. The overall length of the locking bar assembly is adjustable to suit the width of the inside of the trunk 52. The locking bar assembly 20 preferably has a first suction cup 84 and a second suction cup 86 located at the ends thereof and oriented to bear against the inside side walls of the automobile trunk 52 to maintain a bias fit and hold the locking bar assembly 20 firmly in place.

OPERATION

When installing each device 10 on the automobile 14, the locking bar assembly 20 is placed horizontally inside the open trunk 52. The cups 84 and 86 are adjusted so that the assembly 20 maintains a bias fit within the trunk. The cups 84 and 86 bear against the inside side walls of the trunk. The locking bar assembly 20 may be adjustable by means other than a spring, for example, by threading the inner bar 80 for threadable engagement with the outer bar 78.

The hook 74 is then affixed, for example, to the front wheel well 42. Other placements of the hook on the front end of the automobile 14, such as the front grill, are also feasible. The cushioned pad 12 and straps 16 and 18 are then pulled taut rearwardly to extend across the side panels of the automobile over the left side rear panel and into the trunk. The strap 18 is tightened around the locking outer bar 78 by adjustment of the buckle 76. This same process is repeated for installing the device 10 over the side panels of the other side of the automobile 14. The trunk door 54 is then closed and locked so that the locking bar assembly 20 is inside the trunk and each device 10 is secure from theft. There is no interference with opening the trunk door. When removing the device 10 from the automobile, the trunk door is unlocked and opened. For ease of disassembly, the hook(s) can be removed from the front wheel well and the device stored for its next use. The device 10 can, of course, also be removed by detaching the buckle 76 from the locking bar assembly 20 but this approach would necessitate resizing each device 10 with its next use.

Although a particular embodiment of the invention has been described in detail for purposes of illustration, various modifications may be made without departing from the spirit and scope of the invention. Accordingly, the invention is not to be limited, except as by the appended claims.

I claim:

1. A protection device for side portions of a vehicle having a trunk, comprising in combination:

at least one pad member;

fastening means having portions thereof extending forwardly and rearwardly in a horizontal direction from the pad member for releasably securing the pad member to at least one side portion of the vehicle; and locking means located within an enclosed lockable portion at a rear end portion of said vehicle and forcibly bearing against inside portions of said enclosed lockable portion of said vehicle for lockably securing one end portion of said fastening means therein, said enclosed lockable portion of said vehicle is the trunk of said vehicle.

2. The protection device of claim 1 wherein said locking means are adjustably secured to the rearwardly extending portion of said fastening means.

3. The protection device of claim 2 wherein the forwardly extending portion of said fastening means is secured to a front end portion of said vehicle.

4. The protection device of claim 1 wherein the pad member comprises an elongated padded member.

5. The protection device of claim 1 wherein the forwardly extending portion of said fastening means comprises a fastening member and an expandable flexible strap.

6. The protection device of claim 5 wherein the fastening member comprises a hook.

7. The protection device of claim 6 wherein the hook includes a rubber coating thereon.

8. The protection device of claim 6 wherein the hook is releasably connected to a front wheel well of the vehicle.

9. The protection device of claim 1 wherein the rearwardly extending portion of said fastening means comprises a fastening member having adjustment leans for adjusting a length of said fastening member thereon.

10. The protection device of claim 9 wherein the fastening member comprises a bendable rigid strap.

11. The protection device of claim 9 wherein the adjustment means comprises a buckle.

12. The protection device of claim 1 wherein the locking means comprises a longitudinally adjustable elongated bar assembly.

13. The protection device of claim 12 wherein the elongated bar assembly comprises an elongated hollow outer bar and an elongated inner bar having a spring, the inner bar received within the outer bar for providing an adjustable bar assembly.

14. The protection device of claim 13 wherein the elongated bar assembly includes bearing means for forcibly bearing against inside side walls of the enclosed lockable portion for maintaining a bias fit.

15. The protection device of claim 14 wherein the bearing means includes a first and second suction cup at each end of the elongated bar assembly.

16. A protection device for an automobile comprising in combination:

a pad member assembly having cushion means for protecting sides of said automobile and first and second fastening means for tightly securing the pad member assembly to the sides of said automobile, the first fastening means is expandable and releasably secured to a front side portion of said automobile; and locking assembly means coupled to the pad member assembly for preventing unauthorized removal of said pad member assembly from said automobile, the locking assembly means including an elongated adjustable locking bar and bearing means for bearing against the inside of a trunk for said automobile and the second fastening means passing inside the trunk for lockable securement to the locking bar.

17. A protection device for sides of an automobile comprising in combination:

an elongated cushioned pad to shield the sides of the automobile from nicks, dents and scratches, the pad having a forward and a rearward end;

a first expandable strap attached at a first end thereof to the pad forward end and having a hook at a second end, the hook to be releasably secured to a front side portion of the automobile;

a second bendable strap attached at a first end thereof to the pad rearward end and having a buckle near a second end; and a locking bar having two ends adapted to forcibly bear against a pair of oppositely disposed inside side walls of a trunk, the second end of the second strap adjustably tightened by the buckle around the locking bar.

18. A method for protecting side portions of a vehicle having a trunk, comprising the steps of:

providing at least one pad member;

providing fastening means having portions thereof extending forwardly and rearwardly in a horizontal direction from the pad member for releasably securing the pad member to at least one side portion of the vehicle; and providing locking means located within an enclosed lockable portion at a rear end portion of said vehicle and forcibly bearing against inside portions of said enclosed lockable portion of said vehicle for lockably securing one end portion of said fastening means therein, said enclosed lockable portion of said vehicle is the trunk of said vehicle.

* * * * *

UNITED STATES PATENT AND TRADEMARK OFFICE
CERTIFICATE OF CORRECTION

PATENT NO  : 5,975,599
DATED      : 11-02-99
INVENTOR(S): GOLDSTEIN

It is certified that error appears in the above-identified patent and that said Letters Patent is hereby corrected as shown below:

On the title page:
Item [76]    Address:   Change 7071 to 7017

Signed and Sealed this

Twenty-third Day of May, 2000

Attest:

Q. TODD DICKINSON

Attesting Officer    Director of Patents and Trademarks